(12) United States Patent
Liu

(10) Patent No.: US 9,528,644 B2
(45) Date of Patent: Dec. 27, 2016

(54) QUICK CONNECTOR ASSEMBLY

(71) Applicant: ZOJE KITCHEN & BATH CO. LTD., Yuhuan (CN)

(72) Inventor: Boxiu Liu, Yuhuan (CN)

(73) Assignee: ZOJE KITCHEN & BATH CO. LTD., Yuhuan (CN)

( * ) Notice: Subject to any disclaimer, the term of this patent is extended or adjusted under 35 U.S.C. 154(b) by 393 days.

(21) Appl. No.: 14/104,089

(22) Filed: Dec. 12, 2013

(65) Prior Publication Data

US 2015/0167878 A1    Jun. 18, 2015

(51) Int. Cl.
*F16L 37/084*    (2006.01)

(52) U.S. Cl.
CPC .......... *F16L 37/0841* (2013.01); *F16L 37/084* (2013.01)

(58) Field of Classification Search
CPC ............................ F16L 37/0841; F16L 37/084
USPC .................................................. 285/308, 305
See application file for complete search history.

(56) References Cited

U.S. PATENT DOCUMENTS

| | | | | |
|---|---|---|---|---|
| 4,632,436 A | * | 12/1986 | Kimura | F16L 37/0841 285/305 |
| 5,104,158 A | * | 4/1992 | Meyer | F16L 37/0841 285/308 |
| 5,366,259 A | * | 11/1994 | Hohmann | F16L 37/107 285/23 |
| 5,374,088 A | * | 12/1994 | Moretti | F16L 37/0841 285/305 |
| 6,082,779 A | * | 7/2000 | Lesser | F16L 37/0841 285/319 |
| 6,086,119 A | * | 7/2000 | Hansel | F16L 37/0987 285/309 |
| 6,089,616 A | * | 7/2000 | Trede | F16L 37/0841 285/308 |
| 6,318,764 B1 | * | 11/2001 | Trede | F16L 37/0841 285/305 |
| 2004/0089301 A1 | * | 5/2004 | Choi | A45F 3/06 128/203.29 |
| 2013/0092271 A1 | * | 4/2013 | Downs | F16L 37/0841 137/798 |
| 2013/0300108 A1 | * | 11/2013 | Frick | F16L 37/0841 285/319 |

FOREIGN PATENT DOCUMENTS

| | | | | |
|---|---|---|---|---|
| DE | GB 2524169 A | * | 9/2015 | .......... F16L 37/0841 |
| FR | 3017687 A1 | * | 8/2015 | .......... F16L 37/0841 |
| JP | EP 0018440 A1 | * | 11/1980 | .......... F16L 37/0841 |

* cited by examiner

*Primary Examiner* — Christine T Cajilig
(74) *Attorney, Agent, or Firm* — Anova Law Group, PLLC

(57) ABSTRACT

A quick connector assembly is provided for releasably connecting and disconnecting a first conduit and a second conduit. The connector assembly includes a first member having a joint fitting coupled to the first conduit, and a second member having a sleeve with opening for coupling to the second conduit. The second member has a connection end containing an opening for receiving the join fitting. The connector assembly also includes a lock inserted into the second member for locking the first member into the second member. The connection end includes a slot configured to receive the lock; the joint fitting includes a groove; and the lock is in a general ring shape and includes at least one curved portion for engaging the groove on the joint fitting, and a button for causing the curved portion to deform so as to engage or disengage the groove.

12 Claims, 6 Drawing Sheets

QUICK CONNECTOR ASSEMBLY

FIELD OF THE INVENTION

The present invention generally relates to connector assembly technologies and, more particularly, relates to a quick connector assembly for connecting and disconnecting conduits.

BACKGROUND

Conduits for conveying liquids or gases are used in many industries. Traditionally conduits come in two forms: rigid conduits or flexible conduits. Connection between conduits can be realized by using a large variety of connectors. The connectors are therefore essential for connecting conduits.

Currently, one disadvantage of most connectors is that significant amount of time is often required to perform the connection or disconnection. For example, connection or disconnection may need to tighten or loosen nuts or screws, which may often require generic or special tools. Thus, it is often difficult to tighten and loosen nuts, screws or connectors when connecting and disconnecting conduits. A need exists for a connector assembly that can easily and quickly connects and disconnects conduits, and for providing interchangeability between connections of various conduits.

The disclosed methods and systems are directed to solve one or more problems set forth above and other problems.

BRIEF SUMMARY OF THE DISCLOSURE

One aspect of the present disclosure provides a quick connector assembly for releasably connecting and disconnecting a first conduit and a second conduit. The connector assembly includes a first member having a joint fitting coupled to the first conduit, and a second member having a sleeve with opening for coupling to the second conduit. The second member has a connection end containing an opening for receiving the joint fitting. The connector assembly also includes a lock inserted into the second member for locking the first member into the second member to connect the first conduit and the second conduit. The connection end includes a slot configured to receive the lock; the joint fitting includes a groove; and the lock is in a general ring shape and includes at least one curved portion for engaging the groove on the joint fitting, and a button for causing the curved portion to deform so as to engage or disengage the groove.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Generally, conduits are either rigid, such as pipes, or flexible, such as hoses. One conduit often needs to be connected to another so that all forms of substances, including gas and liquid, etc., can be conveyed in a connected conduit system. Conduits also need to be disconnected when the conduit system needs maintenance or repair.

Figure 1:
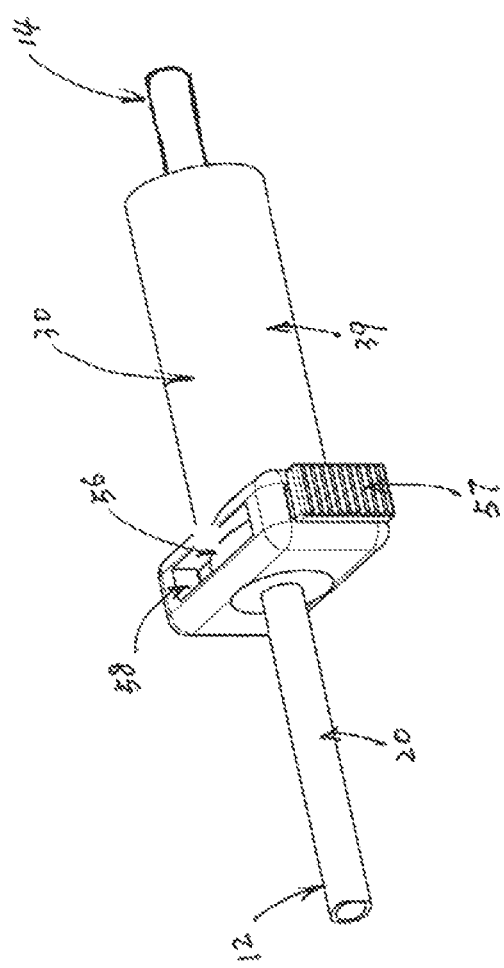
FIG. 1 shows a perspective view of an exemplary quick connector assembly connecting a pair of conduits consistent with the disclosed embodiments.
Figure 2:
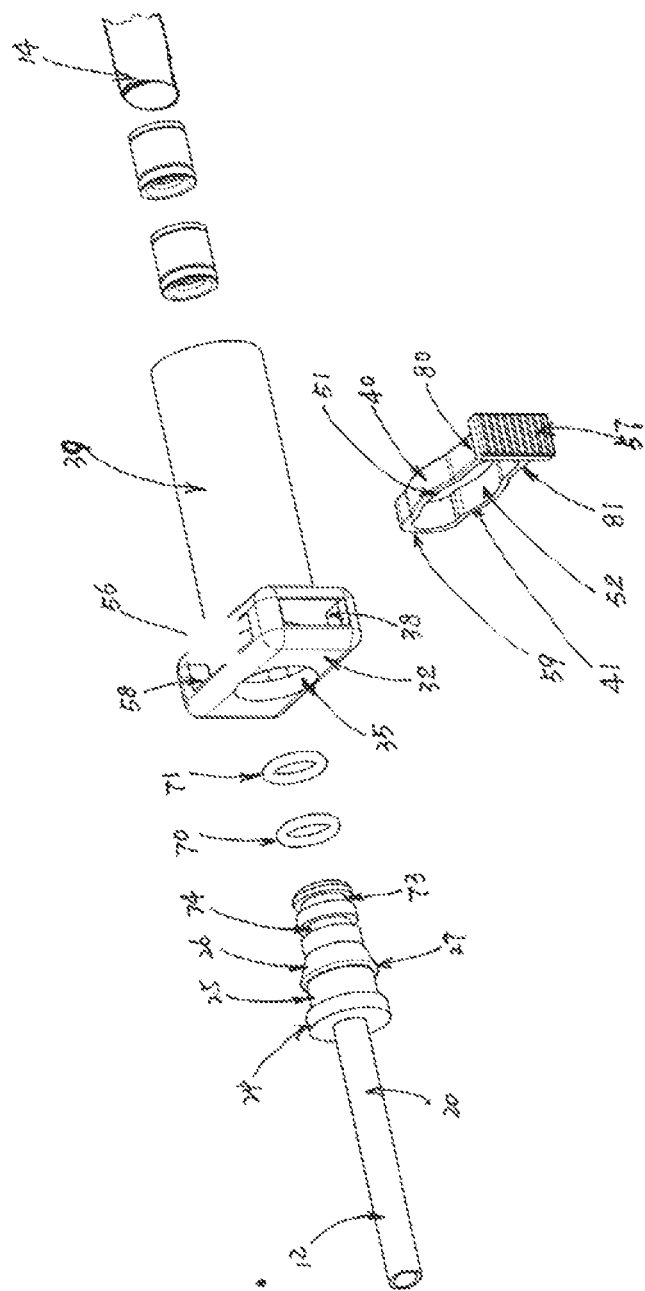
FIG. 2 shows an exploded view of the quick connector assembly consistent with the disclosed embodiments.

A quick connector assembly is disclosed to connect and/or disconnect conduits. FIG. 1 illustrates a perspective view of an exemplary quick connector assembly connecting a pair of conduits consistent with the disclosed embodiments. FIG. 2 illustrates an explosive view of the quick connector assembly.

As shown in FIG. 1 and FIG. 2, a connector assembly is provided for connecting and disconnecting a pair of conduits, a first conduit 12 and a second conduit 14. The connector assembly includes a first member 20 and a second member 30. The first member 20 is coupled with the first conduit 12 from one distal end of the first member 20, and the second member 30 is coupled with the second conduit 14 from one distal end of the second member 30.

Either the first member 20 or the second member 30 may be coupled to a corresponding conduit by any appropriate coupling means. For example, the first member 20 may be soldered or welded with the first conduit 12, and the second member 30 may be flexibly attached to the second conduit 14. The second member 30 includes a lock 36, a sleeve 39, and a threaded portion 34. The threaded portion 34 is adapted to be connected to the other conduit, i.e., the second conduit 14. Other coupling means may also be used.

The first member 20 and the second member 30 may be made of any appropriate material. For example, the first member 20 may be made of metal, such as copper, and the second member 30 may be made of non-metal material, such as plastic or other composite material.

The first member 20 has a joint fitting 24 at the opposite end of the first conduit 12. The joint fitting 24 (the first member 20) has a groove 25 formed on the outer surface of the first member 20, a tapered surface 26 (e.g., a cone-shaped surface) which has a top 27. Top 27 may have similar diameter to the bottom of the joint fitting 24, and groove 25 is disposed between the bottom of the joint fitting 24 and the top 27. The joint fitting 27 may have a circular cross-section shape, and two grooves 73 and 74 formed on the outer surface of the first member 20. The two grooves 73 and 74 are configured to receive seals 71 and 70, respectively. The seals 71 and 70 may include any appropriate type of seals, such as O-ring type seals. The seals 71 and 70 may be made of a resilient material, such as rubber, plastic, or another similar material. Any number of grooves and seals may be used.

The second member 30 also includes a connection end 32 and an opening 35 extending from the connection end 32. The connection end 32 may have a flat surface, and the connection end may be in a shape suitable for easy manipulation by a user, such as a cube, a cuboid, a cylinder, a rectangular prism, a hexagonal prism, a sphere, or other three-dimensional geometry shape.

The opening 35 may be in a circular shape for receiving the joint fitting 24 of the first member 20. Further, the connection end also include a slot 38 (or a chamber 38), a slot wall 58, and an opening 56 on the top of the slot 38 and the bottom of the slot 38. The slot 38 is configured to receive a lock member 36, which is described subsequently.

The first member 20 and the second member 30 are configured to be connected to each other to form the connector assembly. Particularly, the joint fitting 24 of the first member 20 projects through the opening 35 and moves into the interior portion of the second member 30.

Figure 4:
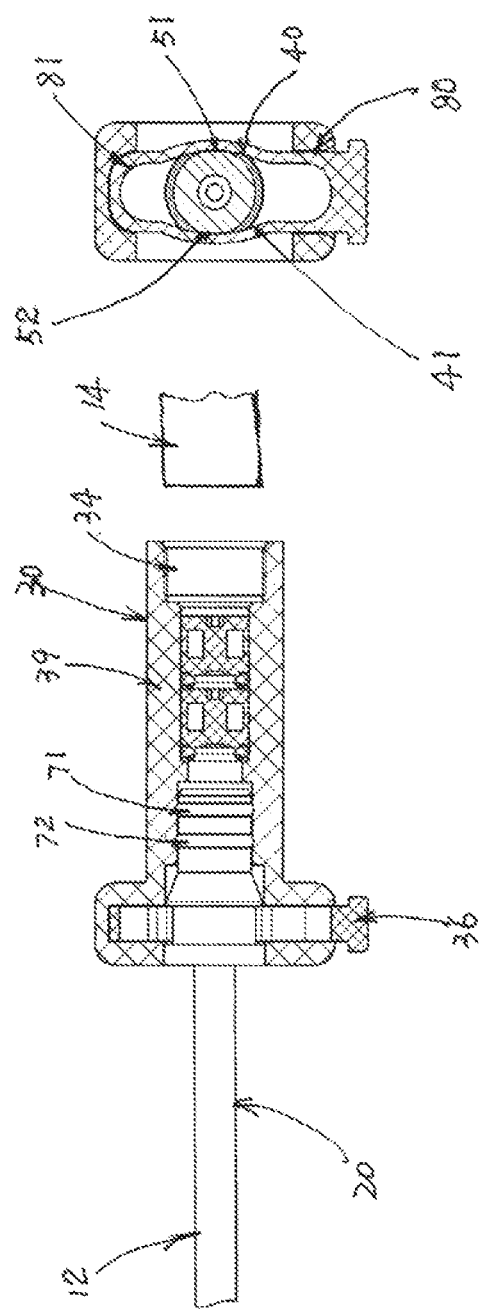
FIG. 4 shows a cross-sectional view of the connector assembly consistent with the disclosed embodiments.

That is, the first member 20 and the second member 30 are coupled together to create a passage to connect the first conduit 12 and the second conduit 14. FIG. 4 illustrates the quick connector assembly in a connected state.

As shown in FIG. 4, the second member 30 has an interior structure that matches the first member 20 (i.e., the joint fitting 24) such that the first member 20 and the second member 30 are coupled together to form the passage between the first conduit 12 and the second conduit 14. In addition to closely matched contours, the connection between the first member 20 and the second member 30 is also sealed by the seals 70 and 71 in grooves 73 and 74 formed on the outer surface of the first member 20.

On the other hand, the first member 20 and the second member 30 can also be decoupled to disconnect the first conduit 12 and the second conduit 14. That is, the first member 20 can be removed from the second member 30 such that the first conduit 12 and the second conduit 14 are disconnected.

Thus, referring to FIG. 2 and FIG. 4, the first member 20 and the second member 30 have cooperative structures for either connecting them together or disconnecting them. To enable the second member 30 releasably receives the first member 20, the lock 36 is provided together with the connection end 32 of the second member 30.

Specifically, the lock 36 is positioned within the slot 38 formed in the connection end of the connecting sleeve 39 of the second member 30. The lock 36 can move smoothly within the slot 38 and the placement of the lock 36 within the slot 38 also fixes the longitudinal movement of the lock 36, i.e., this placement prevents the lock 36 from moving upwardly or downwardly along central longitudinal axis of the connector assembly.

As shown in FIG. 2, the lock 36 has a general rectangular loop or ring structure, including a bottom end 59, a button end 57, and two sides. The upper side includes a flat portion 80 and a curved portion 40, and the curved portion 40 has an inner surface 51. The lower side includes a flat portion 81 and a curved portion 41, and the curved portion 41 has an inner surface 52. The upper side and the lower side may be symmetrically arranged, or may be arranged in a non-symmetric fashion. The upper side and/or the lower side may be structured to match groove 25 of the first member 20.

That is, the lock 36 has at least one generally curvilinear configuration cooperatively dimensioned with the groove 25 formed on the outer surface of the first member 20. For example, the curved portion 40 and/or the curved portion 41 may have a "C-shaped" configuration to facilitate installation of the curvilinear configuration onto the groove 25 of the first member 20.

At the same time, the curved portion 40 and/or the curved portion 41 may also facilitate installation of the curvilinear configuration into the slot 38 of the second member 30. Specifically, the lock 36 may be resilient and the dimension of the lock 36 (with the curved portion 40 and/or the curved portion 41) may be slightly bigger than that of the slot 38 in the radial direction.

In such configuration, when inserting the lock 36 into the slot 38, the lock 36 (with the curved portion 40 and/or the curved portion 41) may be slightly deformed or pressed to slip into slot 38 such that the curved portion 40 and/or the curved portion 41 may be locked into the opening 56 at the top side of the slot 38 and/or the opening 56 at the bottom side of the slot 38. The bottom end 59 of the lock 36 matches and couples with flat 58 of the slot 38.

On the other hand, the lock 36 can also be removed from slot 38 by deforming or pressing the curved portion 40 and/or the curved portion 41 such that the curved portion 40 and/or the curved portion 41 may be no longer locked into the opening 56 at the top side of the slot 38 and/or the opening 56 at the bottom side of the slot 38.

That is, to prevent the lock 36 from slipping out or releasing from the slot 38, the curved portion 40 and/or the curved portion 41 of the lock 36 can be elastically deformable and movable in the opening 56 of the second member 30 between a compressed position and an expanded position in a plane perpendicular to central longitudinal axis of the connector assembly.

Figure 3:
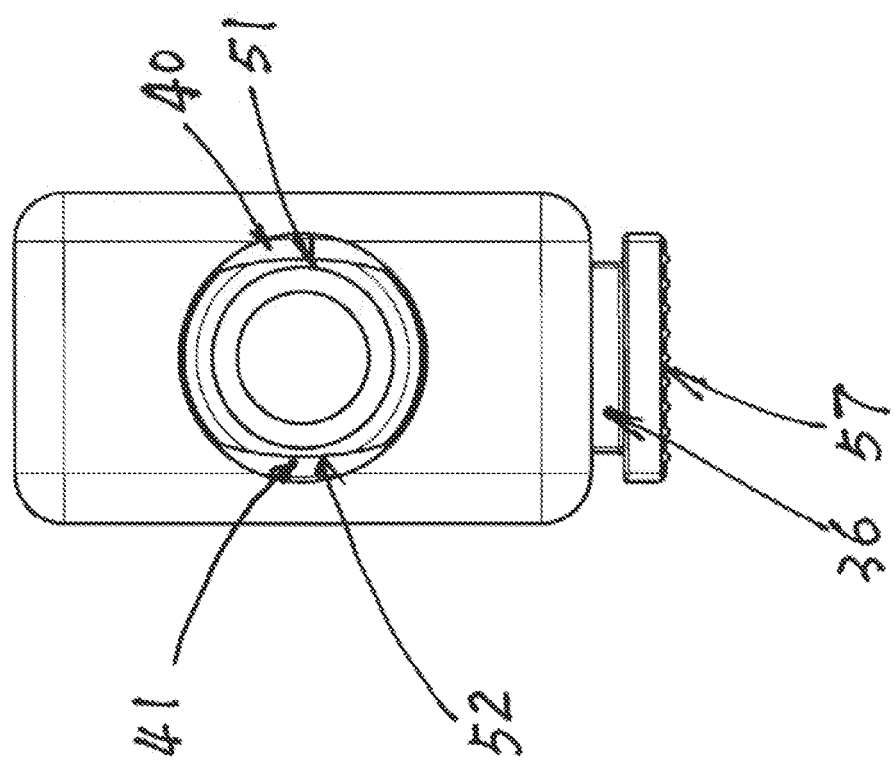
FIG. 3 shows an end view of a second member of the connector assembly consistent with the disclosed embodiments.

Further, the inner surface 51 and/or the inner surface 52 may be used as at least one engagement points for coupling the lock 36 with the first member 20 through groove 25. FIG. 3 illustrates an engaged position between two engagement points 51 and 52 and the first member 20.

As shown in the FIG. 3, the lock 36 has two engagement points 51 and 52 from the curved portion 40 and the curved portion 41, respectively. The two engagement points 51 and may be made of same flexible material as the lock 36. The dimension of the curved portion 40 and the curved portion 41 are configured to the same or similar as the diameter of the groove 25 of the first member 20. Thus, after the first member 20 is coupled with the second member 30 and two engagement points 51 and 52 engage the groove 25 of the first member 20, the two engagement points 51 and 52 locks the first member 20 in place.

That is, before connecting the first member 20 and second member 30 to connect the first conduit 12 and the second conduit 14, the lock 36 is fully inserted into the connection end of the second member 30. Afterward, the first member 20 is inserted into the second member 30 such that the first member 20 and the second member 30 couples together (e.g., joint fitting 24 engages into opening 35), and the lock 36 locks the first member 20 in place by the two engagement points 51 and 52.

Returning to FIG. 2, because the dimension of the curved portion 40 and the curved portion 41 is similar to that of the groove 25 (e.g., diameter), which is smaller than that of top surface 27 of the tapered surface 26, the curved portion 40 and the curved portion 41 may be deformed during insertion of the first member 20 into the second member 30 such that the curved portion 40 and the curved portion 41 can engage the groove 25. The tapered surface 26 may be a smooth cone-shaped surface gradually tapered down/up such that the curved portion 40 and the curved portion 41 may deform gradually when the tapered surface 26 passes through the curved portion 40 and the curved portion 41.

Referring to FIG. 2 and FIG. 3, the button end 57 of lock 36 may have a rough surface, such as a serrated surface, such that more traction can be achieved when the button end 57 is pressed by the user. When the button 57 is pressed, the ring shape of the lock 36 may be deformed such that the curved portion 40 and the curved portion 41 may be disengaged from the groove 25 of the first member, after which the first member 20 may be released from the second member 30.

When the curved portion 40 and the curved portion 41 are deformed when the first member 20 is inserted in the second member 30 or when the button end 57 is pressed to release the first member 20 from the second member 30, the curved portion 40 and the curved portion 41 may extend into the opening 56 on the connection end of the second member.

Referring FIG. 2, in addition, when connecting the second conduit 14, one or more nozzles may also be provided to couple the open end of the first member 20 to the second conduit 14 (FIG. 2 shows two nozzles in front of the second conduit 14—not labeled). The nozzles can be fit into the interior structure of the sleeve 39. Other coupling device may also be used.

FIG. 4 further illustrates the interrelationship of the cooperative structures flexibly connecting the first member 20 and the second member 30. As shown in FIG. 4, to connect the first member 20 and the second member 30, the tapered surface 26 passes through the opening 35 into the second member 30. While the joint fitting 24 projects through the opening 35, the tapered surface 26 is also inserted into the lock 36 of the second member 30. Once the top 27 of the tapered surface 26 passes the distal end of the curvilinear structure (e.g., 40, 41) along central longitudinal axis of the second member 30, naturally, the resilience of the curvilinear structure (e.g., 40, 41) would cause the engagement points 51 and 52 to move inwardly and to be snap fitted into the groove 25 and engage the groove 25. As a result, the engagement points 51 and/or 52 engage the groove 25 of the first member 20.

When the first member 20 is connected to the second member 30, the joint fitting 24 of the first member 20 or the sleeve 39 of the second member 30 may have at least one seal positioned at the junction of the parts connected. For example, the connector assembly includes a pair of O-ring type seals 70 and 71 made of a resilient material, such as rubber, plastic, or another similar material. These seals 70 and 71 are retained within two grooves 73 and 74 formed on the outer surface of the first member 20, respectively. That is, when the first member 20 and second member 30 are connected, these seals 70 and 71 abut against the inner surface of the second member 30. This configuration may prevent leakage of fluids or gases passing from the first conduit 12 into the second conduit 14 through the first member 20 and the second member 40.

Further, while the first conduit 12 may be adapted to be connected through the joint fitting 24 of the first member 20, the first conduit 12 may be also connected to the joint fitting 24 by the use of thread. Alternatively, a common hose clamp (not shown) may be used for providing secure attachment of the first conduit 12. Of course, other connection means may also be provided.

Figure 5:
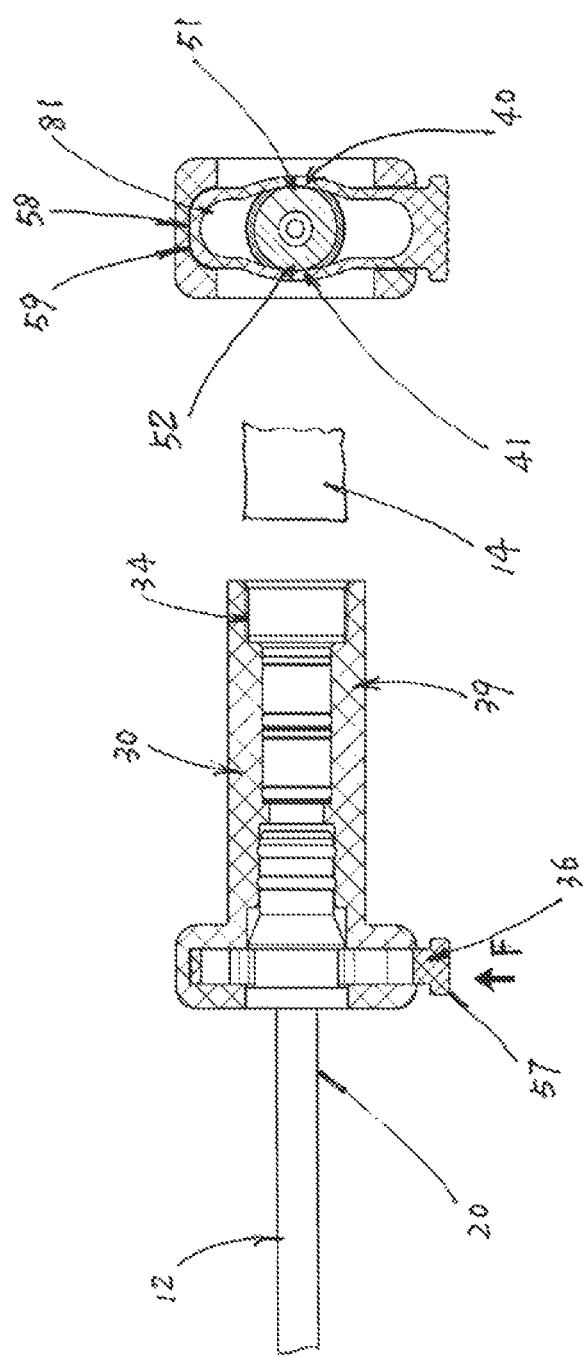
FIG. 5 shows a cross-sectional view of the connector assembly consistent with the disclosed embodiments.

FIG. 5 also illustrates an engaged quick connector assembly. As shown in FIG. 5, the first member 20 and the second member 30 are connected and the connection is locked by the lock 36. The lock 36 includes one or more curvilinear configurations (e.g., 40, 41, 80, 81). The two curvilinear configurations include two engagement points 51 and 52, respectively.

The lock 36 includes flat 59 and button 57. The connecting sleeve 39 includes flat 58. By applying a compression force F on the button 57 of the lock 36, the flat 59 of the lock 36 moves inwardly against the flat 58 within the slot 38 of the sleeve 39. Continued application of the compress force F on the button 57 causes the curvilinear configurations to bend flexibly and resiliently, which causes the corresponding outward movement of the engagement points 51 and 52 away from central longitudinal axis of the connector assembly.

As a result, the engagement points 51 and 52 disengage from the groove 25, permitting the first member 20 being pulled from the second member 30 to achieve disconnection of the first member 20 and the second member 30.

The first member 20 may be a one-piece construction, and made of metal, such as brass, bronze, copper, or iron. The second member 30 made of metal or plastic. Other suitable materials may also be used, as long as the curved portions 40 and 41 of the shaped ring of the lock 36 can engage the slot 25 to retain the first member 20 in connection with the second member 30, or disengage from the slot 25 to facilitate the disconnection of the first member 20 from the second member 30 by resilience of the curvilinear configurations 40 and 41.

While one slot 25, one tapered surface 26, two engagement points 51 and 52, and two curved portions 40 and 41 are used for illustrative purposes, any number of slots, engagement points, and curvilinear configurations may be provided in other embodiments.

Figure 6:
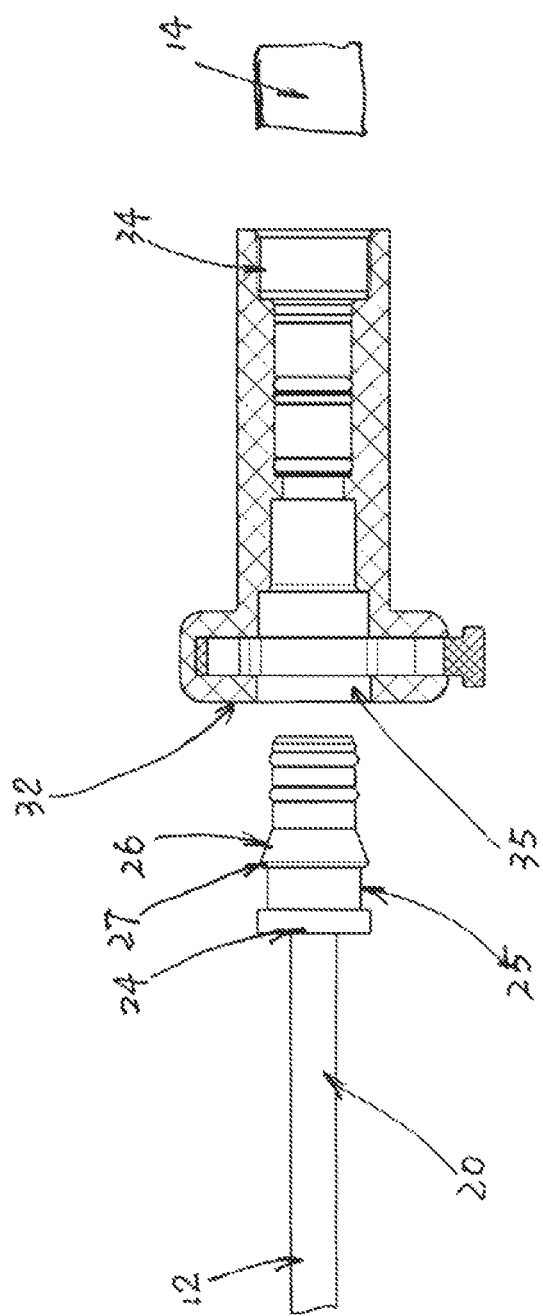
FIG. 6 shows a cross-sectional view of the connector assembly in the disconnected position consistent with the disclosed embodiments.

FIG. 6 illustrates a disengaged quick connector assembly. As shown in FIG. 6, the first member 20 and the second member 30 are disconnected.

During the disconnection of the connector assembly, the procedure required is the reverse of the connection procedure. Generally, to disconnect the connector assembly, the engagement points 51 and 52 formed on the curvilinear configurations (e.g., 40, 41) may need to be moved outwardly away from central longitudinal axis of the connector assembly until the engagement points 51 and 52 become disengaged from the groove 25 and sufficiently large for passing the top 27 of the tapered surface 26. When this occurs, the first member 20 can be disengaged from the second 30.

More particularly, the lock 36 is squeezed inwardly by applying a compression force, typically with the fingers of the user, on the flat button 57 of the lock 36. The compression force causes the curvilinear configurations (e.g., 40, 41) to bend flexibly and resiliently such that the engagement points 51 and 52 move outwardly away from central longitudinal axis of the connector assembly. As a result, the engagement points 51 and 52 disengage from the groove 25. Afterwards, the first member 20 and second member 30 of the connector assembly can be completely disengaged or disconnected.

By using the disclosed methods and systems, various advantageous connector assembly applications can be implemented. For example, one advantage is the speed and convenience with which conduits can be connected and disconnected. Traditionally, conduits are connected by using a fitting such as threaded couplers, which requires significant time. With the disclosed quick connector assembly, a substantially less amount of time is need to insert the first member into the opening of the second member, such that the engagement points would engage the groove of the first member while the top of the tapered surface passes the distal end of the curvilinear structure of the second member along the central longitudinal axis of the connector assembly.

Similarly, the release of the first member from the second member can be done as quickly, requiring only a compression force on the flat button of the lock on the second member by fingers of the user. Thus, the connector assembly provides a "quick connector" with significant advantages over existing structures.

Another advantage the disclosed connector assembly is the interchangeability and ability to connect different conduits. That is, a large variety of conduits can be quickly connected by using different first member and/or second member of the connector assembly. Thus, the connector assembly provides a way to interchangeably connect a large variety of conduits by using a standard "quick connector assembly."

Other advantages, applications, and modifications may be obvious to those of ordinary skill in the art.

What is claimed is:

1. A connector assembly for connecting a first conduit and a second conduit, comprising:
    a first member having a joint fitting coupled to the first conduit;
    a second member having a sleeve with opening for coupling to the second conduit, and a connection end containing an opening for receiving the joint fitting; and
    a lock inserted into the second member for locking the first member into the second member to connect the first conduit and the second conduit,
    wherein:
    the connection end of the second member includes a slot configured to receive the lock, a flat slot wall, and at least one opening on a wall of the slot;
    the joint fitting includes a groove;
    the lock is in a general ring shape and includes at least one curved portion for engaging the groove on the joint fitting, a button for causing the curved portion to deform so as to engage or disengage the groove, and a bottom end for matching and coupling with the flat slot wall of the connection end of the second member; and
    the at least one opening on the wall of the slot is configured to receive the at least one curved portion of the lock such that the lock can fit into the slot.

2. The connector assembly of claim 1, wherein:
    the second member includes a threaded portion for connecting the second conduit.

3. The connector assembly of claim 1, wherein:
    the joint fitting includes a tapered surface and a plurality of grooves for receiving respective seals; and
    an interior of the second member is configured to match the tapered surface and to seal the connection between the first member and the second member by the respective seals in the plurality of grooves.

4. The connector assembly of claim 3, wherein:
    wherein the seals are o-ring seals.

5. The connector assembly of claim 3, wherein:
    the tapered surface of the joint fitting has a top surface with a diameter larger than the groove on the first member for engaging the lock.

6. The connector assembly of claim 5, wherein:
    the tapered surface is a smooth cone-shaped surface such that the curved portion deforms gradually when the tapered surface passes through the curved portion.

7. The connector assembly of claim 1, wherein: the lock is a rounded rectangular shape having two curved portion on both sides of the slot for engaging the groove of the joint fitting.

8. The connector assembly of claim 7, wherein:
    the dimension of the rounded rectangular shape is configured to fit tightly in the groove with the two curved portion as engagement points with the groove.

9. The connector assembly of claim 8, wherein:
    the button of the second member includes a serrated surface and is configured to apply a compression force against the rounded rectangular shape such that the two curved portions are deformed to enlarge the dimension for releasing the first member from the second member.

10. The connector assembly of claim 9, wherein:
    the slot has a bottom end for matching a bottom of the lock such that the bottom of the lock is pressed against the bottom end of the slot to cause deformation of the lock when the compression force is continuously applied.

11. The connector assembly of claim 9, wherein:
    the joint fitting is made of metal;
    the second member is made of plastic; and the lock is made of plastic.

12. The connector assembly of claim 1, wherein:
    the joint fitting and the opening on the connection end for receiving the joint fitting are both in a circular shape.

* * * * *